(12) United States Patent
Chen et al.

(10) Patent No.: US 11,133,774 B2
(45) Date of Patent: Sep. 28, 2021

(54) SOLAR TRACKING SENSOR BASED ON FIBER LIGHT GUIDANCE

(71) Applicant: JIANGSU UNIVERSITY, Jiangsu (CN)

(72) Inventors: Mingyang Chen, Jiangsu (CN); Li Zhang, Jiangsu (CN); Pipi Liu, Jiangsu (CN); Guodong Cao, Jiangsu (CN); Xiaoming Xu, Jiangsu (CN)

(73) Assignee: JIANGSU UNIVERSITY

( * ) Notice: Subject to any disclaimer, the term of this patent is extended or adjusted under 35 U.S.C. 154(b) by 24 days.

(21) Appl. No.: 16/614,253

(22) PCT Filed: Jan. 3, 2018

(86) PCT No.: PCT/CN2018/070093
§ 371 (c)(1),
(2) Date: Nov. 15, 2019

(87) PCT Pub. No.: WO2018/214513
PCT Pub. Date: Nov. 29, 2018

(65) Prior Publication Data
US 2020/0091859 A1    Mar. 19, 2020

(30) Foreign Application Priority Data

May 26, 2017 (CN) .......................... 201710382280.0

(51) Int. Cl.
*H02S 20/32* (2014.01)
*H02S 40/20* (2014.01)
*G05D 3/10* (2006.01)

(52) U.S. Cl.
CPC ............. *H02S 20/32* (2014.12); *G05D 3/105* (2013.01); *H02S 40/20* (2014.12)

(58) Field of Classification Search
CPC ........ H02S 20/32; H02S 40/20; G05D 3/105; G05D 3/12; Y02E 10/47; Y02E 10/50;
(Continued)

(56) References Cited

U.S. PATENT DOCUMENTS 4,723,826 A * 2/1988 Whitaker ................ F24S 23/30
126/576

FOREIGN PATENT DOCUMENTS

| CN | 101750068 | 6/2010 | ............. G01C 21/24 |
| CN | 204495463 | 7/2015 | ................ G01J 1/42 |

(Continued)

OTHER PUBLICATIONS

International Search Report (w/translation) and Written Opinion (w//machine translation) issued in application No. PCT/CN2018/070093, dated Mar. 30, 2018 (14 pgs).

*Primary Examiner* — Tony Ko
(74) *Attorney, Agent, or Firm* — Hayes Soloway P.C.

(57) ABSTRACT

A solar tracking sensor includes lens and four fibers respectively representing four directions installed in a lens barrel to serve as a fine-positioning daylighting module, and four groups of fibers installed on the side of the lens barrel to serve as a coarse-positioning daylighting module. A circuit board and four photocells are installed at the bottom of a cassette. Each photocell is connected to fine positioning fibers located in the same direction as the photocell, and is connected to coarse positioning fibers located in a direction diagonal to the direction of the photocell. By using a daylighting method of combining fine-positioning daylighting and coarse-positioning daylighting, the number of the photocells is reduced, the design of the circuit board is simplified, and costs are reduced; moreover, because the (Continued)

coarse-positioning daylighting module can collect sunlight in a wide-angle range, the tracking angle range of the sensor is enlarged.

10 Claims, 3 Drawing Sheets

(58) Field of Classification Search
CPC ......... F24S 50/20; G02B 6/06; G02B 6/4202; G02B 6/4249; G02B 6/4298; G01C 1/00
See application file for complete search history.

(56) References Cited

FOREIGN PATENT DOCUMENTS

| | | | |
|---|---|---|---|
| CN | 105222076 | 1/2016 | ............... F21S 11/00 |
| CN | 105929853 | 9/2016 | ............... G05D 3/12 |
| CN | 107153426 | 9/2017 | ............. G01C 1/100 |

* cited by examiner

SOLAR TRACKING SENSOR BASED ON FIBER LIGHT GUIDANCE

TECHNICAL FIELD

The invention relates to a solar tracking sensor, especially a solar tracking sensor based on optical fibers.

BACKGROUND ART

With the continuous consumption of fossil energy, the development of renewable energy sources has become increasingly urgent. Among all renewable energy sources, solar energy has become one of the important energy sources because of its large quantity, clean and pollution-free characteristics. However, the solar energy also has the disadvantages of uneven distribution and intensity, which increase the difficult of the development and utilization of the solar energy.

Researchers have conducted in-depth and extensive solar energy research, and solar energy products such as water heaters, solar photovoltaic power generation equipment have been successfully put into application, which saves energy and has brought great convenience to human life. However, these are all fixed position solar products. Compared with the moving sun of the earth, the energy used is very little. So there is a lot of research upsurge on real-time tracking of the sun. It has been shown that there is a 37.7% difference in the rate of solar acquisition between fixed solar equipment and solar tracking equipment. Therefore, the development and research of solar tracking equipment is of great significance. The most commonly used sensors for sun tracking are photoelectric sensors, the typical configurations of which are baffle, pyramid and cylinder configurations. The accuracy of the first two is low and the stability is poor. Although cylinder configuration shows improvement on accuracy, the tracking range is limited. Researchers have also proposed the combination of the optical fiber and photoelectric sensor to improve tracking performance. For example, Chinese patent entitled 'Sun sensor and measuring method thereof (No. 200910264755)' presents the technique of guiding solar rays from four directions using optical fibers to photoelectric sensors. The scheme is based on the cosine relation of sunlight angle and the incoming energy to optical fibers, and it is difficult to avoid the influence of stray light and other interference on the results. In addition, the solar light collection ability of a single optical fiber is limited, and owing to the limits of the numerical aperture, GPS should be applied to assist in positioning, the control system is complex, and the cost would be high.

The commonly used high accuracy tracking method is two-step tracking, which is composed of fine-positioning and coarse-positioning. Generally, the two steps are independent of each other, and usually need to collect at least eight channels of signals, use time tracking module or GPS global positioning, etc. Such tracking systems are generally complicated, and the cost is high.

SUMMARY OF THE PRESENT INVENTION

The present invention provides a solar tracking sensor based on optical fibers, the technique combines the fine-positioning and coarse-positioning modules, which can expand the tracking scope, increase tracking precision of the sensor, and reduce the cost of system.

Herein presents a solar tracking sensor based on optical fibers, including a light collecting module and a signal acquisition module, wherein the light collecting module is composed of a fine-positioning module and a coarse-positioning module, and the signal acquisition module is composed of photoelectric elements and an acquisition circuit board, which are listed as follows:

1. A fine-positioning module, wherein the fine-positioning module comprising a convex lens, a lens tube, a fixing tube and four fine-positioning optical fibers, wherein the convex lens is installed at the top of the lens tube, and the input end faces of the four fine-positioning optical fibers are fixed under the convex lens by the fixing tube, wherein the centers of the input end faces of four fine-positioning optical fibers form a square lattice, wherein the orientations of the input end faces of the four fine-positioning optical fibers are defined as four directions of A, B, C and D respectively, and the central axis of the lens tube is perpendicular to the input end faces of the four fine-positioning fibers.

2. A coarse-positioning module, including four coarse-positioning optical fiber groups, wherein the input ends of the four coarse-positioning optical fiber groups are distributed uniformed on the outside surface of the lens tube, and located in the four directions of A, B, C, and D respectively, the number of coarse-positioning optical fibers in each coarse-positioning optical fiber group is the same, the coarse-positioning optical fibers are passed through the lens tube, the input ends of the coarse-positioning optical fibers are on the outside surface of the lens tube, and the angle between the central axis of the lens tube and the vertical line of the input end of each coarse-positioning optical fiber is greater than $\alpha_{max}$, wherein $\alpha_{max}$ is the maximum incidence angle of the coarse positioning optical fibers.

3. A signal acquisition module, wherein the module includes four photovoltaic cells, a dark box and a circuit board, wherein the dark box is located on the bottom of the said lens tube, wherein the dark box is divided into four dark lattices and the four dark lattices are arranged in A, B, C, and D directions, respectively. Each dark box contains a photovoltaic cell, and a circuit board is arranged on the inner bottom surface of the dark box. The photovoltaic cells are integrated on the circuit board.

The input end centers of the fine-positioning optical fibers and the coarse-positioning optical fibers in the directions of A and C are located in the same plane, and the input end centers of the fine-positioning optical fibers and coarse-positioning optical fibers in the directions of B and D are located in the same plane.

The four fine-positioning optical fibers and the four coarse-positioning fiber groups form four lighting groups, each of which includes a fine-positioning optical fiber and a coarse-positioning optical fiber group in the diagonal direction, and all the output ends of optical fibers in each lighting group are passed through the dark box, arranged in a dark lattice of the dark box, and connected to a photovoltaic cell, wherein the photovoltaic cells are connected to the corresponding light collecting modules, respectively.

The spot radius d focused by the convex lens on the input end faces of the four fine-positioning fibers should meet the condition of $(\sqrt{2}+1)r' > d > (\sqrt{2}-1)r'$, where r' is the core radius of the fine-positioning optical fibers.

The distance between the input ends of the four fine-positioning optical fibers and the center of the convex lens is $$L = F - \frac{\sqrt{2} F * r'}{R},$$

where R is the radius of the convex lens, F is the focal length of the convex lens.

The number N of coarse-positioning optical fiber in each coarse-positioning optical fiber group should meet the condition of N≥2, and the angle $\eta_i$ between the vertical line of input end face of the coarse-positioning optical fiber and the central axis of the lens tube should meet the condition of $2\alpha_{max} > \eta_i - \eta_{i-1} > 0$, where N≥i>1, wherein i denotes the order number of the coarse-positioning optical fiber denoted from the top of the lens tube.

In each coarse-positioning optical fiber group, $\eta_1$ should meet the condition of $\eta_1 \leq \alpha_{max} + \beta$, where $$\beta = \arctan\frac{(\sqrt{2}+1)r' + h}{L}$$

and h is the radius of the light spot on the input end surfaces of the fine-positioning optical fibers at the condition of the sunlight incident vertically on the convex lens. In each coarse-positioning optical fiber group, $\eta_N$ should meet the condition of $\eta_N + \alpha_{max} \geq 90°$.

Preferably, the coarse-positioning optical fiber and the fine-positioning optical fiber are all coated with UV curing adhesive.

Preferably, the ratio between the radius of the convex lens R and the core radius r' of the fine-positioning optical fiber should meet the condition of $15 \geq R/r' \geq 5$.

Preferably, the lens tube comprises the first lens tube and the second lens tube, wherein the first lens tube is a cylinder, wherein the convex lens and the fixing tube are placed on the top and bottom of the first lens tube, respectively, wherein the bottom of the fixing tube and the bottom of the first lens tube are on the same plane, wherein the second lens tube is a circular truncated cone, and the two ends of the second lens tube are connected to the first lens tube and the dark box, respectively, wherein the input ends of the coarse-positioning optical fiber groups are distributed on the outside surface of the second lens tube.

Preferably, all the photovoltaic cells are silicon photocells.

The advantages of the present invention are listed as follows.

When the sun shifts at a small angle, the spot focusing on the input end surface of the fine-positioning optical fiber will shift. The difference of light intensity between the two fine-positioning optical fibers in the diagonal direction is more obvious, which greatly improves the tracking accuracy and sensitivity of the sensor.

The scheme of the presented invention includes a coarse-positioning module. When the sun incident angle is larger than the tracking angle range of the fine-positioning module, the sun light will be tracked and positioned by the coarse-positioning module. Because each coarse-positioning optical fiber group includes multiple optical fibers arranged in different angles, they can collect sunlight in a wide-angle range, the tracking angle range of the sensor could be very wide.

The presented invention adopts a positioning method combining fine-positioning module with coarse-positioning module, which reduces the number of photovoltaic cells, and simplifies the design of circuit board and reduces the cost.

The photovoltaic cells of the present invention are integrated into a circuit board, which simplifies the systems of the sensor.

DETAILED DESCRIPTION OF THE PRESENT INVENTION

The invention will be further described below in conjunction with the drawings and specific embodiments.

Figure 1:
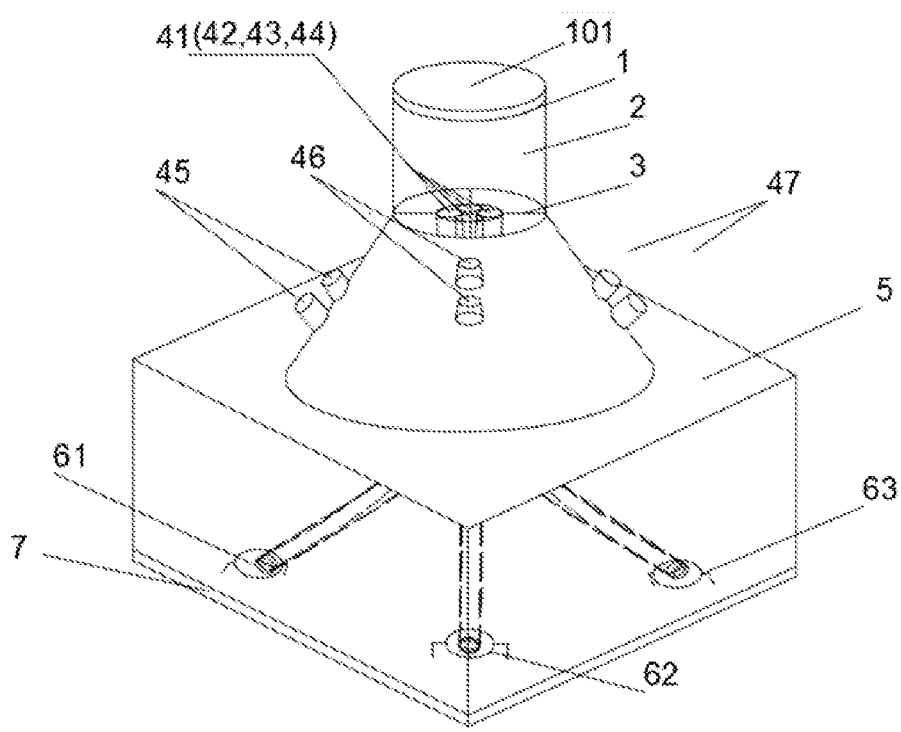
FIG. 1 is the structural diagram of the solar tracking sensor based on optical fibers.

FIG. 1 shows the structural diagram of the solar tracking sensor based on optical fibers, wherein the system comprising a fine-positioning module, a coarse-positioning module, and a signal acquisition module, wherein the fine-positioning module comprising a convex lens 1, a lens tube 2, a fixing tube 3 and four fine-positioning optical fibers 41-44, wherein the lens tube 2 comprises the first lens tube and the second lens tube, wherein the first lens tube is a cylinder, wherein the second lens tube is a circular truncated cone, and the two ends of the second lens tube are connected to the first lens tube and the dark box 5, respectively. The convex lens 1 is installed at the top of the lens tube 2. In order to filter out the unwanted lights such as infrared light, an optical filter 101 may be installed on the top of the convex lens.

The input end faces of the four fine-positioning optical fibers 41-44 are fixed under the convex lens 1 by the fixing tube 3, wherein the centers of the input end faces of the four fine-positioning optical fibers 41-44 form a square lattice, wherein the orientations of the input end face surfaces of the four fine-positioning optical fibers 41-44 are defined as four directions of A, B, C and D respectively, and the central axis of the lens tube 2 is perpendicular to the input end faces of the four fine-positioning fibers 41-44.

The distance between the input and face surfaces of the four fine-positioning optical fibers 41-44 and the center of the convex lens 1 is $$L = F - \frac{\sqrt{2}F*r'}{R},$$

where R is the radius of the convex lens 1, F is the focal length of the convex lens 1. According to the L value, when the sun light is directly incident and the light is concentrated through the lens and reaches the incident end face of the optical fiber, the radius of the light spot would be $h = \sqrt{3}r'$.

The ratio between the radius of the convex lens 1 R and the core radius r' of the fine positioning fiber core should meet the condition of $15 \geq R/r' \geq 5$.

The spot radius d focused by the convex lens 1 on the incident end faces of the four fine-positioning fibers 41-44 should meet the condition of $(\sqrt{2}+1)r' > d > (\sqrt{2}-1)r'$, where r' is the core radius of the fine-positioning optical fibers.

The input end face surfaces of the optical fibers of the four coarse-positioning optical fiber groups 45-48 are distributed on the outside surface of the lens tube 2, and located in the four directions of A, B, C, and D respectively. The number of coarse-positioning optical fibers in each coarse-positioning optical fiber group is the same, for example, the number of the coarse-positioning optical fibers shown in FIGS. 1 and 2 in each coarse-positioning optical fiber group is two.

The number N of coarse-positioning optical fiber in each coarse-positioning optical fiber group should meet the condition of $N \geq 2$, and the angle $\eta_i$ between the vertical line of input end of the coarse-positioning optical fiber and the central axis of the lens tube 2 should meet the condition of $2\alpha_{max} > \eta_i - \eta_{i-1} > 0$, where $N \geq i > 1$, wherein i denotes the order number of the coarse-positioning optical fiber numbered from the top of the lens tube 2 to the bottom. The input ends of the coarse-positioning optical fibers in each coarse-positioning optical fiber group are arranged in a line on the lens tube.

Especially, $\eta_1$ in each coarse fixed fiber group should meet the condition of $\eta_1 \leq \alpha_{max} + \beta$, where $$\beta = \arctan\frac{(\sqrt{2}+1)r' + h}{L}$$

and h is the radius of the light spot on the input end surfaces of the fine-positioning optical fibers 41-44 at the condition of the sunlight incident vertically on the convex lens 1. For the example shown in FIG. 1, $\eta_2$ in each coarse fixed fiber group should meet the condition of $\eta_2 + \alpha_{max} \geq 90°$ The signal acquisition module includes four photovoltaic cells 61-64, a dark box (5) and a circuit board (7), wherein the dark box 5 is located on the bottom of the said lens tube 2, wherein the dark box 5 is divided into four dark lattices, with each photovoltaic cells 61-64 in a dark lattice, and arranged in A, B, C, and D directions, respectively, wherein a circuit board 7 is arranged on the inner bottom surface of the dark box 5, and the photovoltaic cells 61-64 is integrated on the circuit board 7, wherein the four fine-positioning optical fibers 41-44 and the four coarse-positioning fiber groups 45-48 form four lighting groups, each of which includes a fine-positioning optical fiber and a coarse-positioning optical fiber group in the diagonal direction, and all the output ends of optical fibers in each lighting group are arranged in a dark lattice of the dark box 5, and connected to a photovoltaic cell. Dark box 5 is made of black body material, which can block light and make photovoltaic cells in dark space, thus ensuring that photovoltaic cells do not interfere with each other when receiving light.

The input end centers of the fine-positioning optical fibers and the coarse-positioning optical fibers in the directions of A and C are located in the same plane, and the input end face surface centers of the fine-positioning optical fibers and coarse-positioning optical fibers in the directions of B and D are located in the same plane.

Figure 2:
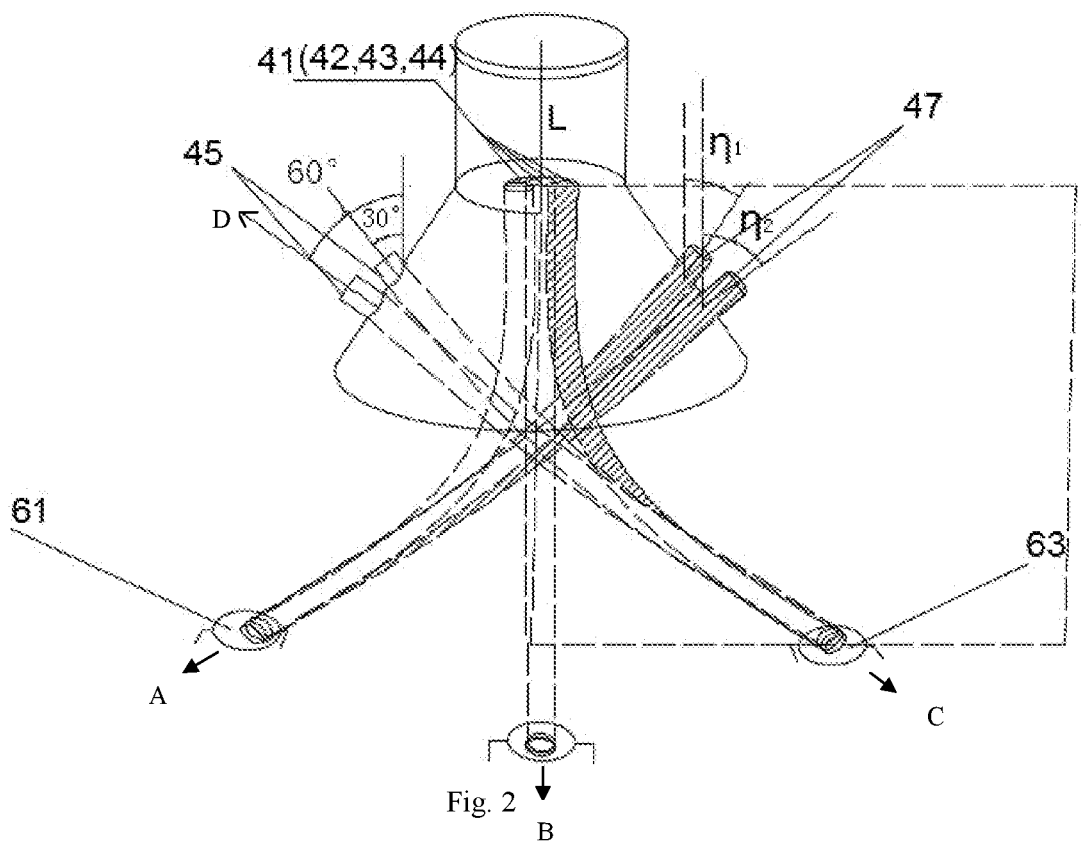
FIG. 2 is the schematic diagram of fine-positioning optical fiber and coarse-positioning optical fiber.

The four fine-positioning optical fibers 41-44 and the four coarse-positioning fiber groups 45-48 form four lighting groups, each of which includes a fine-positioning optical fiber and a coarse-positioning optical fiber group, the input ends of the optical fibers in the coarse-positioning optical fiber group are located in the diagonal direction of the input end of the fine-positioning optical fiber, and all the output ends of optical fibers in each lighting group are arranged in a dark lattice of the dark box 5, and connected to a photovoltaic cell 61-64, as shown in FIG. 2.

Figure 3:
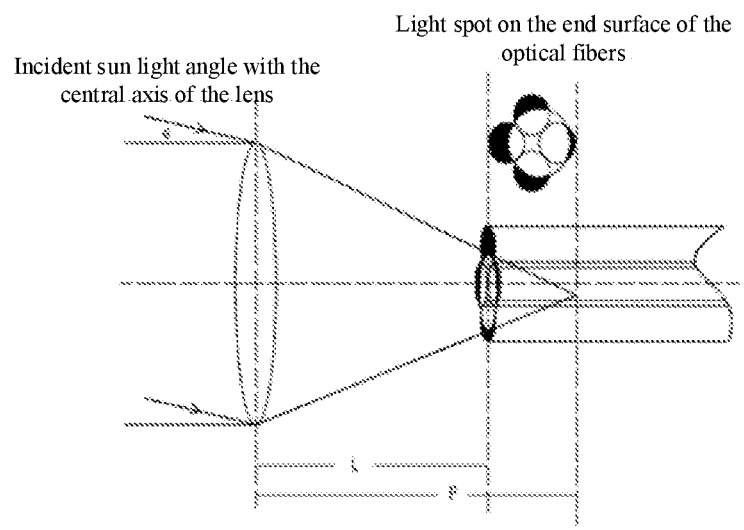
FIG. 3 is the diagram of the principle of fine positioning.

As shown in FIG. 3, when the sunlight incident angle falls within the fine-positioning range, the convex lens 1 focuses the sunlight on the input ends of the fine-positioning optical fiber. When the sunlight ray is parallel to the central axis of the lens tube 2, the concentrated energy in the fine-positioning optical fibers are the same. When the sunlight is at an angle with the central axis of the lens tube 2, the focus spot of the convex lens 1 will also shift, resulting in different focusing energies in different fine-positioning optical fibers, which can be used to determine the direction of the sunlight shifting.

In the overlapping areas of the coarse-positioning angle range and the fine-positioning angle range, the coarse-positioning fiber can still collect light. However, on the one hand, the collected light intensity is much weaker than that of the fine-positioning optical fibers because of its far smaller collecting surface than convex lens 1, on the other hand, because the photovoltaic cells in the four lighting groups collect the sunlight both from the fine-positioning optical fibers and the coarse-positioning optical fibers in the diagonal direction. That is, the coarse positioning optical fiber group and the fine-positioning optical fiber group both derive sunlight, or only the coarse-positioning optical fiber group derives sunlight. Therefore, the coarse-positioning optical fiber group does not affect the judgment of the fine-positioning optical fiber to the direction of the solar light shifting.

The radius of convex lens 1 should be suitable, so as to provide the solar energy with a suitable range for the photovoltaic cell. In order to avoid sunlight from convex lens 1 incident to the side of fine-positioning optical fiber, ultraviolet curing adhesive was added to the cladding of fine-positioning optical fiber 41-44 to protect and avoid sunlight entering the optical fiber from the side. Convex lens 1 can also be replaced by Fresnel lens with the same focusing function.

The spot radius d focused by the convex lens 1 on the input end faces of the four fine-positioning fibers 41-44 should meet the condition of $(\sqrt{2}+1)r' > d > (\sqrt{2}-1)r'$, where r' is the core radius of the fine-positioning optical fibers. That is to say, the maximum area of the spot focused by the convex lens 1 on the input end faces of the four fine-positioning fibers 41-44 is the one which covers exactly the input end faces of the four fine-positioning optical fibers 41-44.

The coverage area of the spot can be tuned by adjusting the value of L. At normal incidence, the spot should ensure that at least some area of each input end face of the four fine-positioning optical fibers 41-44 is covered with light. Ideally, the radius of the spot on the input end of the four fine-positioning optical fibers 41-44 should be $h=\sqrt{3}r'$. That is to say, there are two intersections between the edge of the spot and the edge of each input end of the four fine-positioning optical fibers 41-44, and the straight line of the two intersection points will cross the center of the input end of the fine-positioning optical fiber. When the sunlight produces a small angle deviation, the same angle deviation will cause the largest change of spot area in the surface of the fine-positioning optical fibers, so that more obvious light intensity difference can be obtained and tracking accuracy can be improved.

Figure 4:
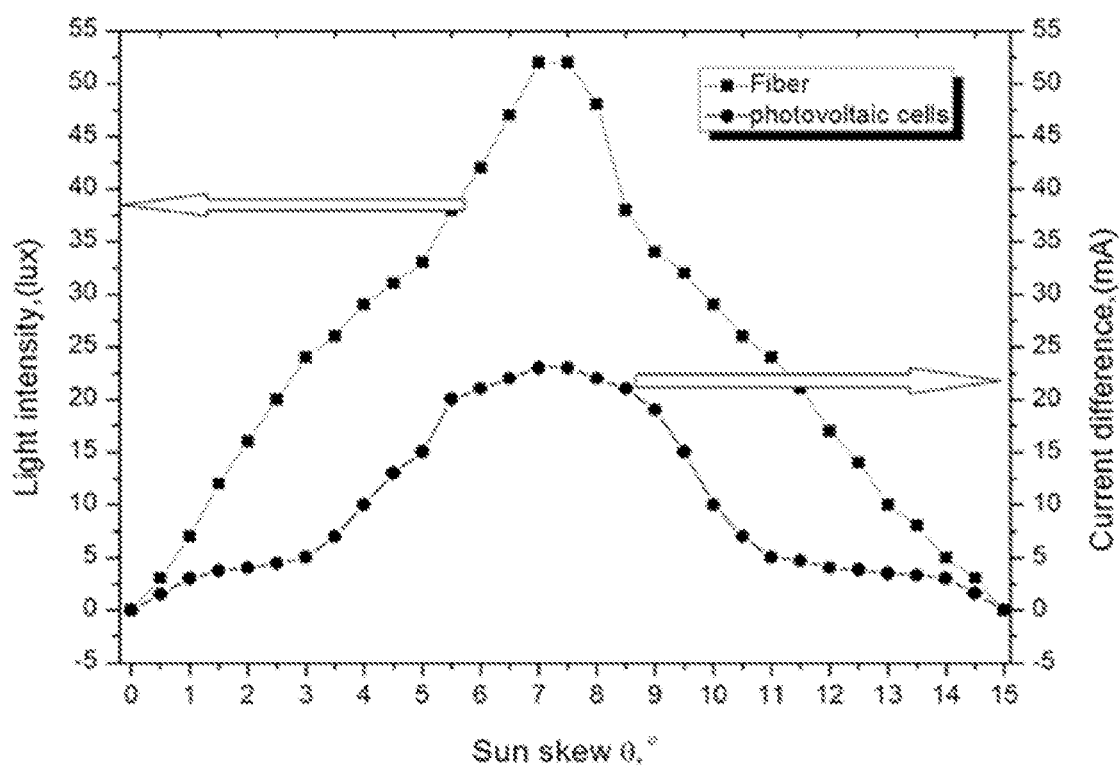
FIG. 4 is the diagram of the output light intensity difference between the two fine positioning optical fibers in the diagonal direction and the output current difference of the corresponding two photovoltaic cells.

FIG. 4 shows the output light intensity difference between the two fine-positioning optical fibers in the diagonal direction and the output current difference of the corresponding two photovoltaic cells. From the figure, it can be seen that the change of output light intensity difference of fine-positioning optical fibers is consistent with the change trend of output current difference of the photovoltaic cells. The experiment proves that the fine-positioning scheme is feasible. The parameters of the convex lens selected in the experiment are 17 mm in diameter, 25 mm in focal length, 2.38 mm in spot radius and 28 mm in distance L. The cladding diameter of the optical fiber is 2 mm and the length is 100 mm.

For such choice, the spot covers exactly the input ends of the four fine-positioning optical fibers, and the tracking accuracy is determined by the spot area change rate on the input end faces of the fine-positioning optical fibers and the photoelectric conversion rate of the photovoltaic cell. If a 12-bit A/D converter is used in the circuit board 7, the light intensity recognized by the photovoltaic cell is 4.88 Lux. The experiment proves that the sensor of the present invention can achieve tracking accuracy of 4.5° in cloudy days, and the sensing accuracy can reach 0.02° when the light intensity reaches 105 Lux. The light intensity can reach $10^9$ Lux at noon in summer, as a result, the accuracy can reach 0.001°.

When the spot radius is chosen to be $h=\sqrt{3}r'$, and the change of output light intensity difference of fine positioning optical fibers can be faster during the solar movement, so that the system resolution and the detection accuracy can be higher.

Because the numerical apertures of coarse-positioning optical fibers are limited, in order to ensure that the sunlight can be collected in a wide angle range, multiple coarse positioning fibers can be arranged in the same direction at different angles, and the centers of the input end faces of these optical fibers in the same group are in a plane with the central axis of the lens tube 2. The incident angle range of the coarse-positioning optical fibers in the same group can overlap, and the angle range between the coarse-positioning optical fibers and the central axis of the lens tube can reach more than 90°.

Figure 5:
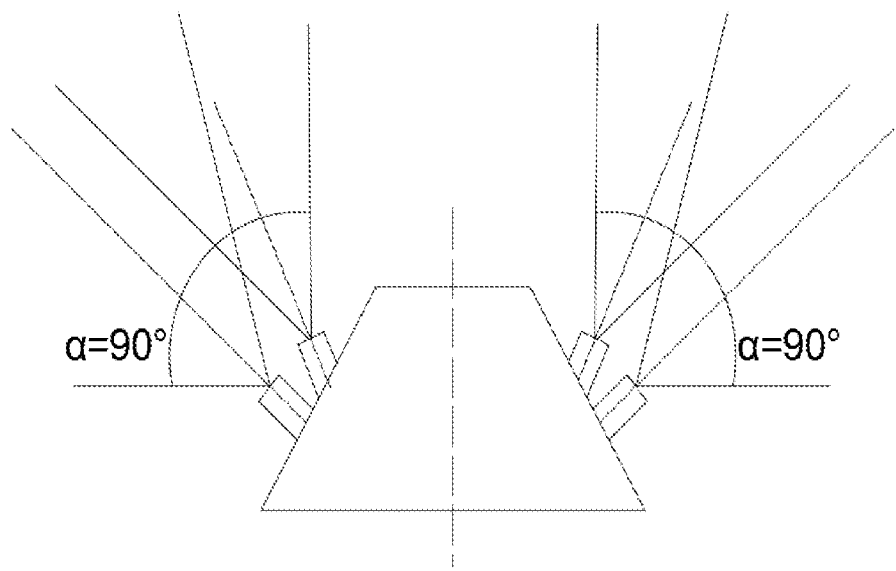
FIG. 5 is the diagram of the principle of coarse positioning.

As shown in FIG. 2 and FIG. 5, there are two optical fibers in each coarse-positioning optical fiber group in this example. The angles between the vertical line of the input ends of the optical fibers and the central axis of the lens tube are 60° and 30°, respectively. The maximum incident angle of the optical fibers is 30°. Therefore, the incident angle range of the two optical fibers overlaps by 30°. This structure can achieve a 90° light collecting angle. Therefore, the collecting angle range of the two groups of coarse-positioning optical fibers in the diagonal direction can reach 180°.

In the coarse-positioning stage, no matter what angle the sunlight is incident on, only one of the coarse positioning fiber groups in the diagonal direction can effectively receive incident light. Therefore, the intensity difference between the two photovoltaic cells in the diagonal direction is more obvious, leading to the possibility of quickly positioning.

The invention uses a closed lens tube 2 to keep the sunlight incident from the side of the optical fibers, so as to avoid the influence of ambient stray light. In order to avoid the sunlight from the lens directly focusing on the photovoltaic cell, dark box 5 is adopted, so that the photovoltaic cell can only receive the light from the output ends of the optical fibers.

Figure 6:
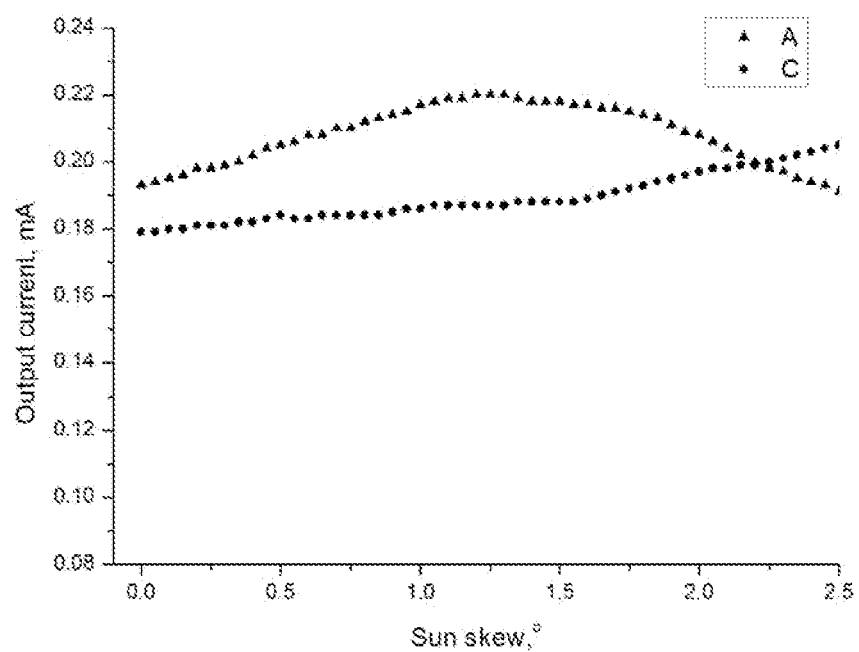
FIG. 6 is the diagram of the output current for the two photovoltaic cells in the diagonal direction, where 1 denotes lens, 101 denotes optical filter, 2 denotes lens tube, 3 denotes fixing tube, 41-44 denote fine-positioning optical fibers, 45-48 denote coarse-positioning optical fibers, 5 denotes black box, 61-64 denote photovoltaic cell 2, 7 denotes circuit board, L denotes the distance between the input ends of the four fine-positioning optical fibers and the center of the convex lens, F denotes focal length of the convex lens.

FIG. 6 shown the experimental data of a corresponding photovoltaic cell for a coarse-positioning module whose light source deviation angle is ranged from −90° to 0°. From FIG. 6, it can be seen that the current output produced by the photovoltaic cells is in full conformity with the theoretical investigation. The current output of the two photovoltaic cells is the same when the deviation angle of the light source is 0°, which is consistent with theoretical analysis. The experimental results are symmetrical between 0° and 90° and are not presented for simplicity.

Because the coarse positioning fiber directly receives the radiation of sunlight, it is unavoidable to be affected by the interference light, so the accuracy will not be high naturally. Therefore, the combination of fine-positioning and coarse-positioning can not only achieve large-scale tracking, but also achieve high precision and stable operation. The system can also be arranged to collect light signals in three or more directions at the same time. The present invention only introduces positioning in four directions, which is relatively simple and effective.

The present invention has the advantages of simple structure, high precision, high sensitivity and low cost, it is suitable for many kinds of solar energy equipment.

The embodiments are preferred implementations of the present invention. Without departing from the substance of the present invention, any obvious improvements, substitutions or variations can be made by those skilled in the art.

What is claimed is:

1. A solar tracking sensor based on optical fibers, including a light collecting module and a signal acquisition module, wherein the light collecting module is composed of a fine-positioning module and a coarse-positioning module, and the signal acquisition module is composed of photoelectric elements and an acquisition circuit board;

wherein the fine-positioning module comprises a convex lens, a lens tube, a fixing tube and four fine-positioning optical fibers, wherein the convex lens is installed at a top of the lens tube, and the input end face surfaces of the four fine-positioning optical fibers are fixed under the convex lens by the fixing tube, wherein centers of the input end faces of four fine-positioning optical fibers form a square lattice, wherein orientations of the input end faces of the four fine-positioning optical fibers are defined as four directions of A, B, C and D respectively, and a central axis of the lens tube is perpendicular to the input end faces of the four fine-positioning fibers;

wherein the coarse-positioning module comprises four coarse-positioning optical fiber groups, wherein input ends of the four coarse-positioning optical fiber groups are distributed uniformed on an outside surface of the lens tube, and located in the four directions of A, B, C, and D respectively, the number of coarse-positioning optical fibers in each coarse-positioning optical fiber group is the same, the coarse-positioning optical fibers are passed through the lens tube, the input ends of the coarse-positioning optical fibers are on the outside surface of the lens tube, and the angle between the central axis of the lens tube and the vertical line of the input end of each coarse-positioning optical fiber is greater than $\alpha_{max}$, wherein $\alpha_{max}$ is a maximum incidence angle of the coarse positioning optical fibers;

wherein the signal acquisition module comprises four photovoltaic cells, a dark box and a circuit board, wherein the dark box is located on a bottom of the lens tube, wherein the dark box is divided into four dark lattices and arranged in the four directions of A, B, C, and D, respectively, wherein the photovoltaic cells are distributed such that each dark lattice contains a photovoltaic cell, wherein a circuit board is arranged on the inner bottom surface of the dark box, and the photovoltaic cells are integrated on the circuit board;

wherein input end centers of the fine-positioning optical fibers, the coarse-positioning optical fibers and the photovoltaic cells in the directions of A and C are located in a same plane, and the input end centers of the fine-positioning optical fibers, coarse-positioning optical fibers and the photovoltaic cells in the directions of B and D are located in a same plane, wherein four fine-positioning optical fibers and the four coarse-positioning fiber groups form four lighting groups, each of which includes a fine-positioning optical fiber and a coarse-positioning optical fiber group in the diagonal direction, and all the output ends of optical fibers in each lighting group are passed through the dark box, arranged in a dark lattice of the dark box, and connected to a photovoltaic cell, wherein the photovoltaic cells are connected to the corresponding light collecting modules, respectively.

2. A solar tracking sensor based on optical fibers as claimed in claim 1, wherein a spot radius d focused by the convex lens on the input end face surfaces of the four fine-positioning fibers meets the condition of $(\sqrt{2}+1)r' > d > (\sqrt{2}-1)r'$, where r' is the core radius of the fine-positioning optical fibers.

3. A solar tracking sensor based on optical fibers as claimed in claim 1, wherein a distance between the input ends of the four fine-positioning optical fibers and the center of the convex lens is $$L = F - \frac{\sqrt{2} F * r'}{R},$$

where R is the radius of the convex lens, and F is the focal length of the convex lens.

4. A solar tracking sensor based on optical fibers as claimed in claim 1, wherein a number N of coarse-positioning optical fiber in each coarse-positioning optical fiber group meets the condition of $N \geq 2$, and a angle $\eta_i$ between a vertical line perpendicular to the surface input end face of the coarse-positioning optical fiber and a central axis of the lens tube meets the condition of $2\alpha_{max} > \eta_i - \eta_{i-1} > 0$, where $N \geq i > 1$, wherein i denotes the order number of the coarse-positioning optical fiber denoted from the top of the lens tube.

5. A solar tracking sensor based on optical fibers as claimed in claim 1, wherein an angle $\eta_1$ between the vertical line perpendicular to the input end face surface of the coarse-positioning optical fiber and the central axis of the lens tube in each coarse-positioning optical fiber group meets the condition of $\eta_1 \leq \alpha_{max} + \beta$, where $$\beta = \arctan \frac{(\sqrt{2}+1)r' + h}{L}$$

and h is the radius of the light spot on the input end face surfaces of the fine-positioning optical fibers at the condition of the sunlight incident vertically on the convex lens.

6. A solar tracking sensor based on optical fibers as claimed in claim 4, wherein the angle $\eta_N$ between the vertical line perpendicular to the input end face surface of the coarse-positioning optical fiber and the central axis of the lens tube in each coarse-positioning optical fiber group should meet the condition of $\eta_N + \alpha_{max} \geq 90°$.

7. A solar tracking sensor based on optical fibers as claimed in claim 1, wherein the coarse-positioning optical fibers and the fine-positioning optical fibers are all coated with UV curing adhesive.

8. A solar tracking sensor based on optical fibers as claimed in claim 1, wherein a ratio between the radius of the convex lens R and the core radius r' of the fine-positioning optical fiber meets the condition of $15 \geq R/r' \geq 5$.

9. A solar tracking sensor based on optical fibers as claimed in claim 1, wherein the lens tube comprises the first lens tube and the second lens tube, wherein the first lens tube is a cylinder, wherein the convex lens and the fixing tube are placed on the top and bottom of the first lens tube, respectively, wherein a bottom of the fixing tube and a bottom of the first lens tube are on the same plane, wherein the second lens tube is a circular truncated cone, and the two ends of the second lens tube are connected to the first lens tube and the dark box, respectively, wherein the input ends of the coarse-positioning optical fiber groups are distributed on the outside surface of the second lens tube.

10. A solar tracking sensor based on optical fibers as claimed in claim 1, wherein all the photovoltaic cells are silicon photocells.

* * * * *